US006089529A

United States Patent [19]

Boecking

[11] Patent Number: 6,089,529

[45] Date of Patent: Jul. 18, 2000

[54] VALVE FOR CONTROLLING LIQUIDS

[75] Inventor: Friedrich Boecking, Stuttgart, Germany

[73] Assignee: Robert Bosch GmbH, Stuttgart, Germany

[21] Appl. No.: 09/280,687

[22] Filed: Mar. 29, 1999

[30] Foreign Application Priority Data

Mar. 28, 1998 [DE] Germany ............................ 198 13 983

[51] Int. Cl.[7] ...................................................... F16K 31/12

[52] U.S. Cl. ......................................... 251/57; 251/129.06

[58] Field of Search ................................. 251/129.06, 57, 251/30.02; 239/584, 96, 585, 88, 89, 533.3, 535.8, 533.9

[56] References Cited

U.S. PATENT DOCUMENTS 4,728,074 3/1988 Igashira et al. ............................ 251/57

*Primary Examiner*—Kevin Shaver
*Assistant Examiner*—John P. Welsh
*Attorney, Agent, or Firm*—Ronald E. Greigg; Edwin E. Greigg

[57] ABSTRACT

A valve for controlling liquids, which for actuation cooperates with a hydraulic step-up piston bore. A pressure chamber provided in the step-up piston bore is sealed off by two pistons and two diaphragms downstream of the two pistons. To compensate for liquid losses in the pressure chamber caused by pressure exerted on the step-up piston bore, control chambers are formed downstream of the pistons and upstream of the diaphragms, and each of the control chambers are connected to a leaking oil bore via a respective throttle bore. The throttle bores have a sharp-edged transition in the relief direction for the control chamber, and a rounded transition in the filling direction for the control chamber, and as a result a minimum pressure for refilling the pressure chamber is always available. The valve is intended for use in fuel injection systems for motor vehicle internal combustion engines.

2 Claims, 3 Drawing Sheets

32

33

VALVE FOR CONTROLLING LIQUIDS

BACKGROUND OF THE INVENTION

The invention relates to a valve for controlling liquids. One such valve is known from European Patent Disclosure EP 0 477 400 A1. There, the actuating piston of the valve member is disposed, tightly displaceably, in a smaller-diameter portion of a stepped bore, while a larger-diameter piston, which is moved with the piezoelectric actuator, is disposed in a larger-diameter portion of the stepped bore. Fastened between the two pistons is a hydraulic chamber, in such a way that when the larger piston is moved a certain distance by the actuator, the actuating piston of the valve member executes a stroke that is lengthened by the step-up ratio of the stepped bore diameter.

In such valves, the problem arises of compensating for changes in length of the piezoelectric actuator, the valve, or the valve housing through the hydraulic coupling chamber, hereinafter called the pressure chamber for short. Since to open the valve the piezoelectric actuator generates a pressure in the pressure chamber, this pressure also causes a loss of liquid in the pressure chamber. To prevent the pressure chamber from being pumped dry, refilling is necessary. Devices that solve this problem are indeed already known, but no valve is provided in them to monitor the refilling, or is it stated whether the supply medium can be resupplied.

OBJECT AND SUMMARY OF THE INVENTION

The valve of the invention, has the advantage over the prior art that the pressure chamber does not suffer any loss of liquid. This prevents any disadvantageous change in length of the entire apparatus, even if the piezoelectric actuator, valve, or housing should change its length on becoming heated, for instance. The apparatus is also simpler in design, and a secure and reliable sealing is provided.

The invention will be better understood and further objects and advantages thereof will become more apparent from the ensuing detailed description of a preferred embodiment taken in conjunction with the drawing.

DESCRIPTION OF THE PREFERRED EMBODIMENT

Figure 1:
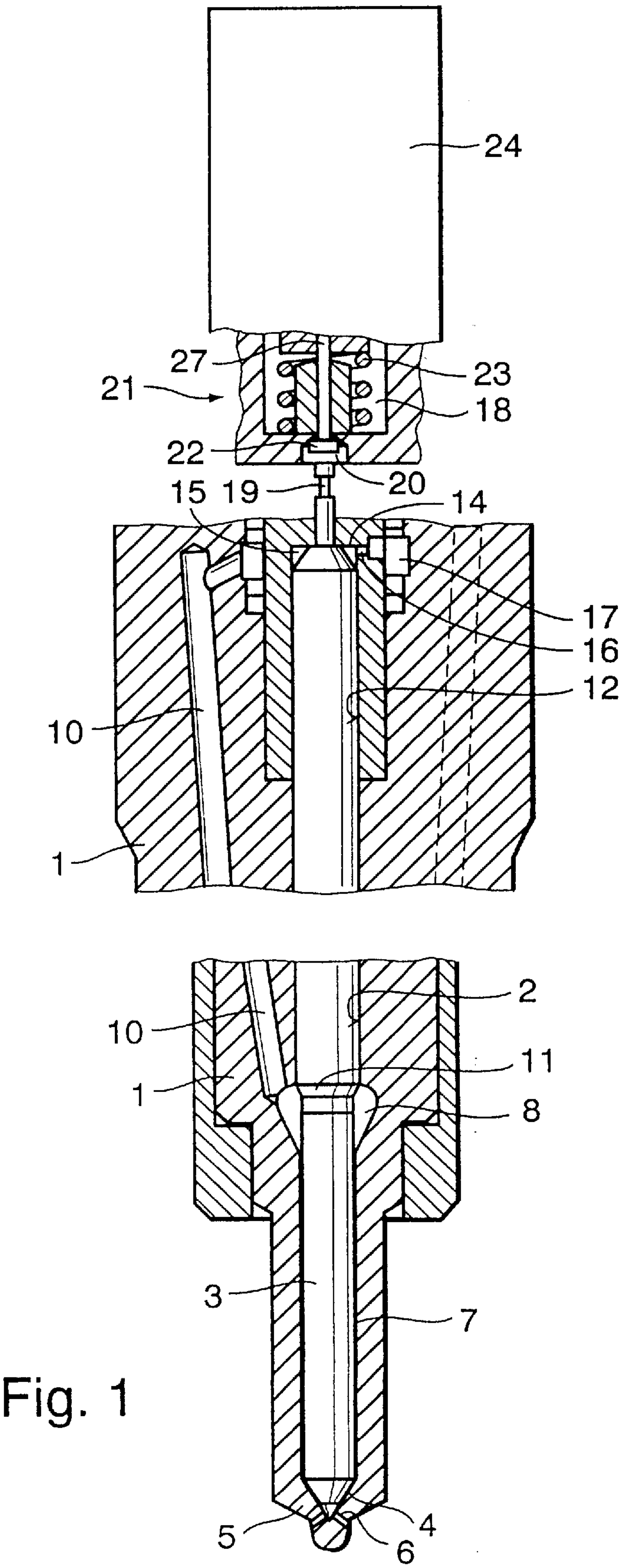
FIG. 1 is a sectional view of a fuel injection valve.

The valve of the invention is used in a fuel injection valve, essential parts of which are shown in section in FIG. 1. This injection valve has a valve housing 1, in which a valve needle 3 is guided in a longitudinal bore 2. On one end, the valve needle is provided with a conical sealing face 4. The conical sealing face cooperates with a seat at the tip 5 of the valve housing that protrudes into the combustion chamber. From this seat, injection openings lead away from the interior of the valve, in this case into the annular chamber 7 surrounding the valve needle 3 and is filled with fuel at injection pressure. Thus, an injection is completed once the valve needle is lifted from its seat. The annular chamber communicates with a further pressure chamber 8, which communicates constantly with a pressure line 10, by way of which fuel at injection pressure is delivered to the fuel injection valve from a high-fuel-pressure reservoir, not shown in further detail. This high fuel pressure is also operative in the pressure chamber 8, where the fuel acts on a pressure shoulder 11, by way of which the valve needle can be lifted from its valve seat in a known way under suitable conditions.

On the other end of the valve needle, the valve needle is guided in a cylinder bore 12, where with its face end 14, the valve needle encloses a control pressure chamber 15. Via a throttle connection 16 the pressure chamber 15 communicates constantly with an annular chamber 17, which like the pressure chamber 8 communicates continuously with the high-fuel-pressure reservoir. A throttle bore 19 leads axially away from the control pressure chamber 15 to a valve seat 20 of a control valve 21. A valve member 22 of the control valve 21 cooperates with the valve seat 20 and in the lifted state establishes a communication between the control pressure chamber 15 and a spring chamber 18, which in turn communicates constantly with a relief chamber. A compression spring 23 that urges the valve member 22 in the closing direction is disposed in the spring chamber 18 and urges the valve member 22 onto the valve seat 20, so that in the normal position of the control valve 21, communication with the control pressure chamber 15 is closed. Since the area of the end face of the valve needle 3 in the region of the control pressure chamber 15 is larger than the area of the pressure shoulder 11, the fuel pressure in the control pressure chamber, which is the same pressure that prevails in the pressure chamber 8, now keeps the valve needle 3 in the closed position. However, if the valve member 22 has lifted from its seat, then the pressure in the control pressure chamber 15, which is decoupled via the throttle connection 16, is relieved. With the closing force now absent, the valve needle 3 opens quickly and can also be brought into the closing position as soon as the valve member 22 is again in its closing position. From that moment on, the original high fuel pressure builds up again rapidly in the control pressure chamber 15, via the throttle 16.

Figure 2:
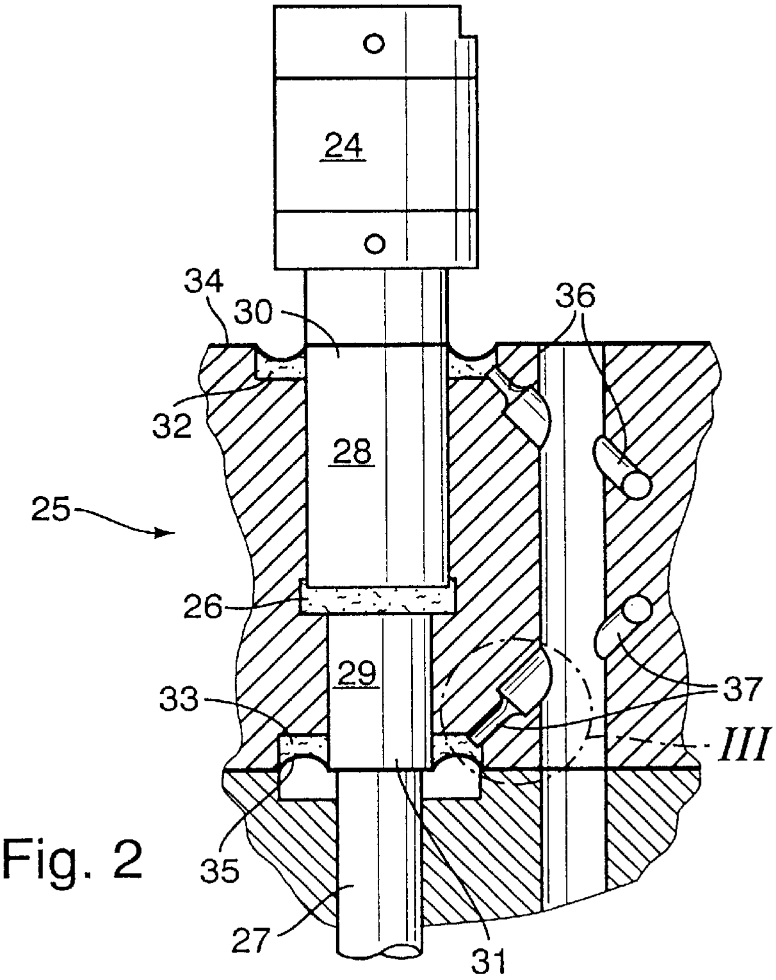
FIG. 2 shows an exemplary embodiment of a hydraulic steps up means with a liquid replenishing valve.
Figure 3:
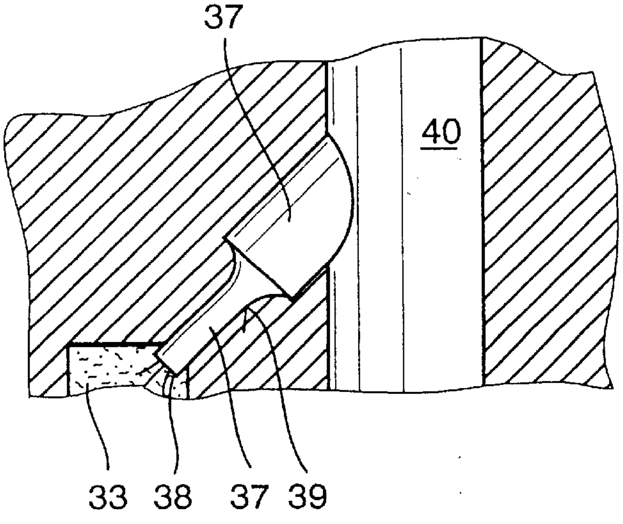
FIG. 3 shows a detail of FIG. 2 on a larger scale.

As FIG. 2 shows, the valve of the invention has a piezoelectric actuator 24 as its actuator, which engages a shaft 27 of the valve member 22 via a hydraulic step-up means 25 with a hydraulic pressure chamber 26. The pressure chamber 26 is defined on one side by a piston 28 of the piezoelectric actuator 24, and on the other side the pressure chamber has a piston 29 as a movable wall, which is connected to the valve member shaft 27.

As viewed from the pressure chamber 26, one control chamber 32 and 33 is formed on the back side 30 and 31 of each piston 28 and 29, respectively, and this control chamber is tightly sealed off toward the actuator or the valve, as applicable, by a respective diaphragm 34 and 35. During operation of the injection valve, the pressure chamber 26 is at high pressure, which causes a slight flow of leaking oil along the piston guides of the two pistons 28 and 29 into the control chambers 32 and 33. As a result, these control chambers 32 and 33 are filled with leaking oil, but this oil has to be returned to the pressure chamber 26 again in order to keep the hydraulic step-up means 25 at a constant length.

Connected to each control chamber 32 and 33 is a respective throttle bore 36 and 37, which is closed on its other end by a ball. The throttle bores 36 and 37 communicate via a leaking oil bore 40 with a low-pressure source, not shown. Each throttle bore 36 and 37 is provided with a sharp-edged transition 38 in the relief direction and a rounded transition 39 in the filling direction. As a result of this provision, it is attained that a flow of liquid that meets the sharp-edged transition 38 on the inlet side is throttled more severely than a flow of liquid that flows in reflux via the rounded transition 39, which means that there is more hindrance to an outflow from the control chambers 32 and 33 than to an inflow serving to refill the pressure chamber.

Mode of Operation

In the stroke of the pistons 28 and 29, a counterpressure is generated in the two control chambers 32 and 33 via the residual faces of the diaphragms 34 and 35. When the injection valve opens the control chamber 32 is operative, while the control chamber 33 is operative when the injection valve is closed. At the same time, in reverse order, the control chambers 32 and 33 are refilled via the throttle bores 36 and 37. Via the inside diameter of the throttle bores 35 and 37 and via a corresponding design of the sharp-edged and rounded transitions 38 and 39, the correct pressure can be established in the control chambers 32 and 33, which assures that a minimum pressure that suffices for refilling the pressure chamber 26 is always available. This in turn assures a constant volume in the pressure chamber 26, which thus also assures that changes in length from heating, for instance, are compensated for. FIGS. 4–7 show graphs that fit together, in which the time is plotted on the abscissa of each. These time values are shown in comparative form by dashed lines in FIGS. 4–7 taken as a whole.

Figure 4:
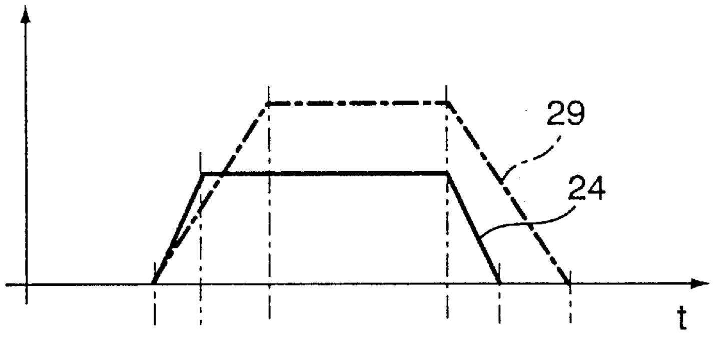
FIG. 4 is a graph plotting the strokes over time.

In the graph of FIG. 4, the strokes of the piezoelectric actuator 24 and of the valve piston 29 are plotted on the ordinates. The piezoelectric actuator stroke is shorter; it generates the longer valve stroke, as a function of the step-up.

Figure 5:
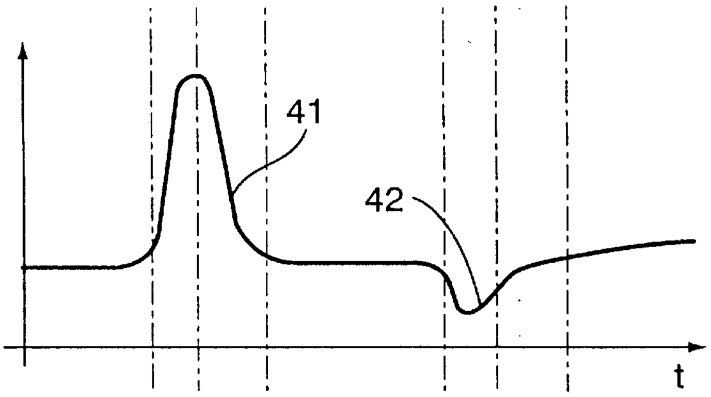
FIGS. 5–7 are three graphs of the pressure courses.

FIG. 5, in a pressure curve 41, shows an initial high pressure in the control chamber 32, which begins with the piezoelectric actuator stroke and then drops off as the valve piston 29 begins to move. Once the piezoelectric actuator is turned off, thus allowing a return stroke, a pressure drop occurs at 42, until the valve piston has followed the piezoelectric actuator. It is via this pressure change that the refilling of the control chamber 32 is accomplished.

Figure 6:
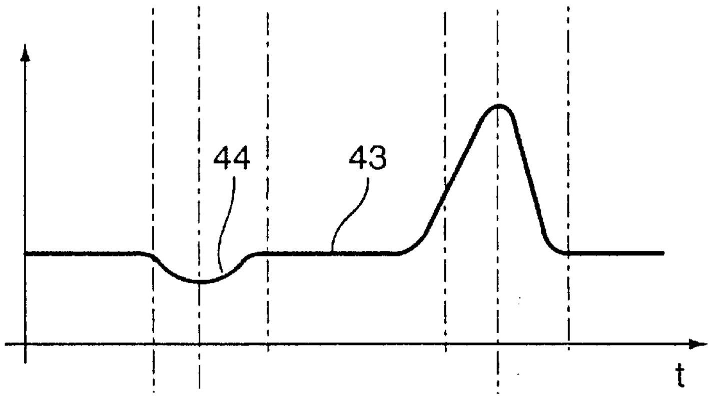

Converse conditions prevail—as documented by the graph in FIG. 6—in the control chamber 33. There, a pressure curve 43 first runs into a trough 44, where filling of the control chamber 33 is performed. This is followed by a pressure peak at the end of the valve stroke. At the end, the pressure curve 43 extends at the pressure level of the leaking oil.

Figure 7:
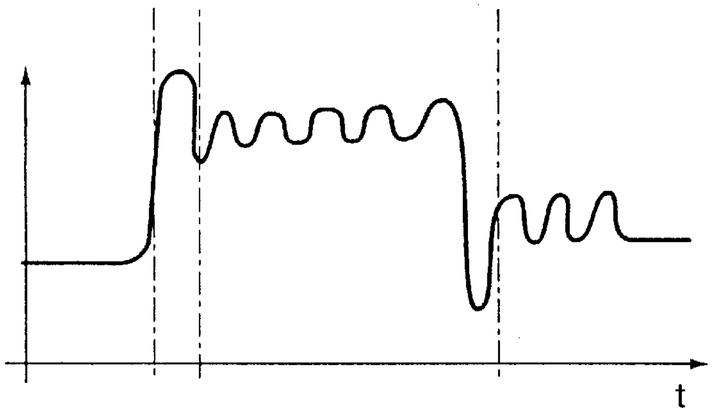

Finally, in the graph of FIG. 7, the pressure step-up by the hydraulic step-up means 25 is shown; it is at a high level when the strokes are long, and then attains a lower level after the valve has performed its switching work.

Although in this exemplary embodiment two throttle bores 36 and 37 and two control chambers 32 and 33 have been described, it is also conceivable to provide these devices on only one side of the pressure chamber 26 instead.

The foregoing relates to a preferred exemplary embodiment of the invention, it being understood that other variants and embodiments thereof are possible within the spirit and scope of the invention, the latter being defined by the appended claims.

We claim:

1. A valve for controlling liquids, comprising a valve member (22) which is actuatable via a hydraulic step-up means (25) and which is urged in a closing direction onto a valve seat (20) by a compression spring (23), the hydraulic step-up means (25) has a pressure chamber (26) that is defined on one side by a piston (28) of a piezoelectric actuator (24), by whose motion a change in pressure in the pressure chamber (26) occurs, which on an other side acts on a piston (29) of the valve member (22), said pistons (28 and 29) also defines the pressure chamber (26) by which the valve member (22) is adjustable in an opening direction counter to a force of the compression spring (23), said pistons (28,29) being guided in respective guide bores, a control chamber (32 or 33) is formed on a back side of at least one of said pistons said control chamber being tightly closed off by a diaphragm (34 or 35) at a remote side of said back side of said piston and being connected with said pressure chamber (26) by a leakage path between said piston and the guide bore of said piston and with, a low-pressure source (40) via a throttle bore (36 or 37).

2. The valve according to claim 1, in which the throttle bore (36 or 37) has a sharp-edge transition (38) in a relief direction and a rounded transition (39) in a filling direction.

* * * * *